(12) United States Patent
Burgman et al.

(10) Patent No.: US 9,033,636 B2
(45) Date of Patent: May 19, 2015

(54) BALANCED SNAP RING

(71) Applicant: GM Global Technology Operations LLC, Detroit, MI (US)

(72) Inventors: Boris Burgman, Oak Park, MI (US); Jonathan Tyler Caulton, Royal Oak, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 57 days.

(21) Appl. No.: 13/839,124

(22) Filed: Mar. 15, 2013

(65) Prior Publication Data

US 2014/0271040 A1    Sep. 18, 2014

(51) Int. Cl.
*F16B 21/18*    (2006.01)

(52) U.S. Cl.
CPC ................................. *F16B 21/186* (2013.01)

(58) Field of Classification Search
USPC .......... 411/352, 353, 516, 517, 521, 965, 970
See application file for complete search history.

(56) References Cited

U.S. PATENT DOCUMENTS

| | | | | |
|---|---|---|---|---|
| 1,752,982 A * | 4/1930 | Herold | ............................ | 470/42 |
| 2,047,590 A * | 7/1936 | Madsen | ........................ | 277/489 |
| 2,607,645 A * | 8/1952 | Westerhouse | .................. | 277/446 |
| 4,714,128 A * | 12/1987 | Yoshinaka et al. | ............ | 180/247 |
| 5,953,955 A * | 9/1999 | Shiga et al. | ...................... | 74/7 A |
| 6,045,135 A * | 4/2000 | Feistel | ........................... | 277/434 |
| 6,358,382 B1 * | 3/2002 | Stucki et al. | .............. | 204/298.12 |
| 6,712,363 B2 * | 3/2004 | Bennitt et al. | ................. | 277/489 |
| 7,090,061 B2 * | 8/2006 | Bove et al. | .................... | 192/70.2 |
| 7,377,735 B2 * | 5/2008 | Cosenza et al. | ................ | 411/517 |
| 7,568,567 B2 * | 8/2009 | Chen et al. | ................... | 192/30 R |
| 2004/0182670 A1 * | 9/2004 | Nojiri et al. | ...................... | 192/38 |
| 2008/0106055 A1 * | 5/2008 | Pinkos et al. | .......... | 280/124.106 |

* cited by examiner

*Primary Examiner* — Roberta Delisle

(57) ABSTRACT

A balanced snap ring and method of making a balanced snap ring is disclosed. The snap ring has a circular shape wherein the circular shape has a circumference. The snap ring has a body section and a protrusion extending axially from the body section. The protrusion is formed partially around the circumference. Additionally, a transmission with a balanced snap ring is disclosed.

18 Claims, 2 Drawing Sheets

BALANCED SNAP RING

TECHNICAL FIELD

The present disclosure relates to balanced snap rings.

BACKGROUND

The statements in this section merely provide background information related to the present disclosure and may or may not constitute prior art.

Snap rings are used to limit axial movement of one part relative to another part. In one particular use, a housing has a circumferential groove cut along an inner diameter sized to fit a portion of the snap ring. The snap ring, which is generally of a circular construction having an open section is compressed to fit into the grove and then released such that spring tension maintains the snap ring in place. The snap ring now extends into the inner diameter of the housing and restricts movement of a component in the housing that contacts the snap ring. Other configurations are well known such as having snap rings snapped into place on an internal component wherein the snap rings prevents axial movement due to the snap ring on the internal component making contact with part of the housing.

Transmissions in vehicles often contain gear sets to transmit one or more forward and reverse gear speed ratios between an engine and at least one drive axle. The gear sets are often disposed in gear housings. The gear sets and other transmission components usually require no or limited axial movement. For example, the gears may be limited by a housing that includes retention features, such as a snap ring. For installation purposes, the snap rings are generally open at one end.

To prevent excessive vibration which can effect customer satisfaction and performance of the transmission and the whole vehicle, the snap rings should be balanced taking into consideration the open end of the snap ring. Conventional snap rings are statically balanced prior to assembly in the transmission by removing material in the radial direction, generally opposite of the open end. In order to balance by removing material in the radial direction, the radial thickness must be great enough to have sufficient material to remove. The required thickness of the material makes it difficult to add balanced snap rings in some applications with limited radial space.

It is therefore apparent that improved balanced snap rings in applications with limited radial space are desired.

SUMMARY

In an aspect of the present invention, a snap ring having a circular shape and a circumference is disclosed. The snap ring has body section and at least one protrusion extending axially from the body section, the protrusion formed partially around the circumference. The snap ring may have an open section and the snap ring has first open end and a second open end.

In another aspect of the present invention, a method of balancing a snap ring is disclosed. A snap ring having a body and at least one protrusion extending axially from body is provided. The actual center of gravity of the snap ring is determined. The actual center of gravity is compared to a desired center of gravity. The amount and location of the protrusion that must be removed from the snap ring so that the actual center of gravity is the desired center of gravity is calculated. At least part of the protrusion in the axial direction so that the actual center of gravity is the desired center of gravity is then removed.

In yet another aspect of the present invention, a transmission is disclosed. The transmission includes a housing having an inner diameter, and a circumferential groove in the inner diameter. A component is included in the housing. A snap ring is provided having a circular shape, the circular shape having a circumference. The snap ring has a body section and at least one protrusion extending axially from the body section, the protrusion is formed partially around the circumference Further areas of applicability will become apparent from the description provided herein. It should be understood that the description and specific examples are intended for purposes of illustration only and are not intended to limit the scope of the present disclosure.

DESCRIPTION OF THE PREFERRED EMBODIMENTS

Figure 2:
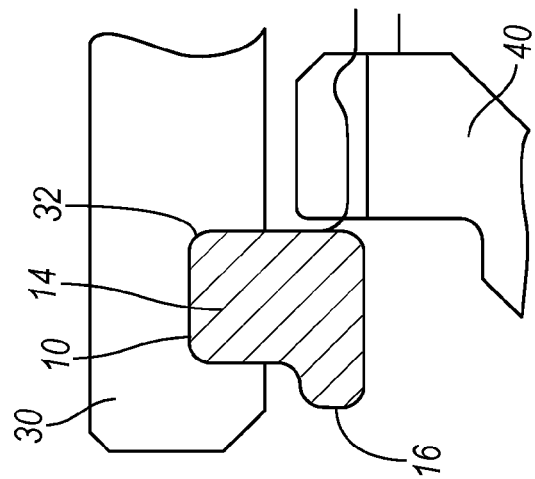
FIG. 2 is a side cross-sectional view of the snap ring assembled in a transmission in accordance with an embodiment of the present disclosure.
Figure 1:
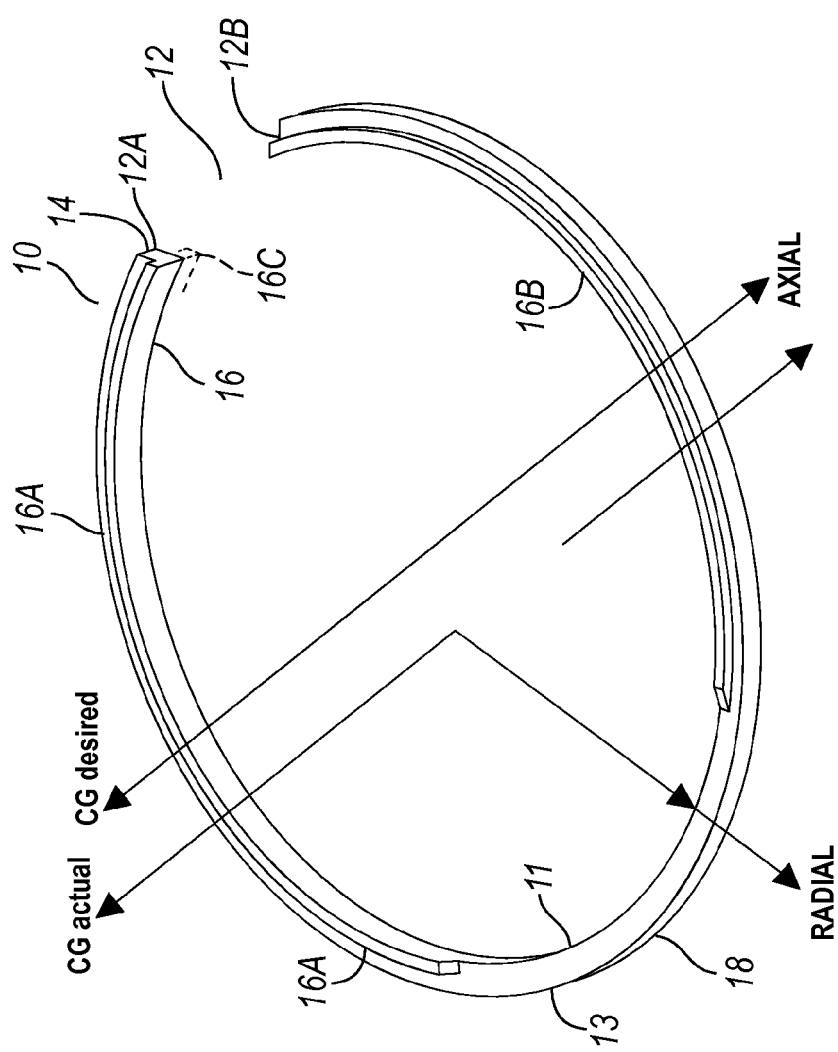
FIG. 1 is a perspective view of a snap ring in accordance with one embodiment of the present invention.

Referring to the drawings, wherein like reference numbers refer to like components, in FIGS. 1 and 2, a snap ring 10 is shown. Snap rings are generally circularly shaped having an open end 12 and inner and outer diameters 11, 13, respectively, and a circumference. The snap ring 10 comprises a body section 14 and a protrusion 16 extending axially from the body section 14. Although the protrusion is shown proximate the inner diameter 11, it may also be located more towards the center of the body section 14. The protrusion 16 may be a flange or rib that extends of the inner diameter 11. The addition of the protrusion 16 may add structural rigidity to the snap ring 10. While the body section 14 is shown rectangularly shaped, the body may be round, oval or shaped otherwise. The snap ring 10 is generally made out of metal, but can be manufactured out of any material having sufficient spring strength and sufficient strength in the axial direction to prevent relative movement. The open section 12 allows the spring to compress to fit it into circumferential grooves 32 in a component 30. A first open end 12a and a second open end 12b are formed adjacent the open end 12. After the snap ring 10 is compressed and placed inside the circumferential groove 32, the snap ring 10 is released and attempts to spring back to its natural state thereby exerting a spring force against the component 30 to retain it in place.

A snap ring having an open section 12 and a protruding section 16 has an actual center of gravity (CGact) as approximately shown in FIG. 1 which may be different that the desired center of gravity (CGdesired) which is the preferred center of gravity of the snap ring 10 in an installed position. In certain high speed rotational applications, such as in an automotive transmission, having a snap ring 10 with a center of gravity different than the rest of the components creates a unbalanced condition which may cause vibration and/or prematurely degrade the components. The difference between the actual center of gravity (CGact) and the desired center of gravity (CGdesired) is caused in part by from the missing material in opening 12 and the fact that the natural state of the snap ring 10 may be more open than the installed state.

In order to eliminate the unbalanced condition and minimize vibration and/or wear, it is advisable to have the snap ring balanced around desired center of gravity (CGdesired). By removing material from the protrusion 16 in the axial direction in the worked area 18, and generally opposite the opening 12, the snap ring 10 will now be balanced about the desired center of gravity (CGdesired) when the part is physically installed. The material may be removed by any method such as, but not limited to, grinding. After removal of a portion of the protrusion 16, the protrusion is shown as two protrusions (16a, 16b) circumferentially extend from the open end 12 a distance less than half the circumference. Alternatively, multiple portions of the protrusion 16 may be removed creating multiple protrusions.

Determining how much material to remove can be determined in numerous ways. Static balancing machines are well known in the art and can be used to determine the actual center of gravity (CGactual) of the part. This can then be compared to the desired center of gravity (CGdesired) of the part and the protrusion 16 can be off to move the actual center of gravity (CGactual) towards the desired center of gravity (CGdesired). Similarly, dynamic balancing machines can also be used to determine the actual center of gravity (CGactual) and to check to make sure the final snap ring is properly balanced.

Alternatively, the amount of material needed to be removed could be determined using simple and well known equations or computer aided engineering methods or software. Simple computer modeling using solid models can determine the actual center of gravity (CGactual) and then determine how much of the axial protrusion 16 must be removed until the actual center of gravity is the same as the desired center of gravity (CGdesired).

Once the amount of material to be removed is determined, the calculations or determinations do not have to be redone for similar parts and multiple balanced snap rings 10 can be made using the same calculations. However, for critical components, physically testing each snap ring 10 may be necessary to make sure that the actual center of gravity (CGactual) is in the correct location.

Figure 3:
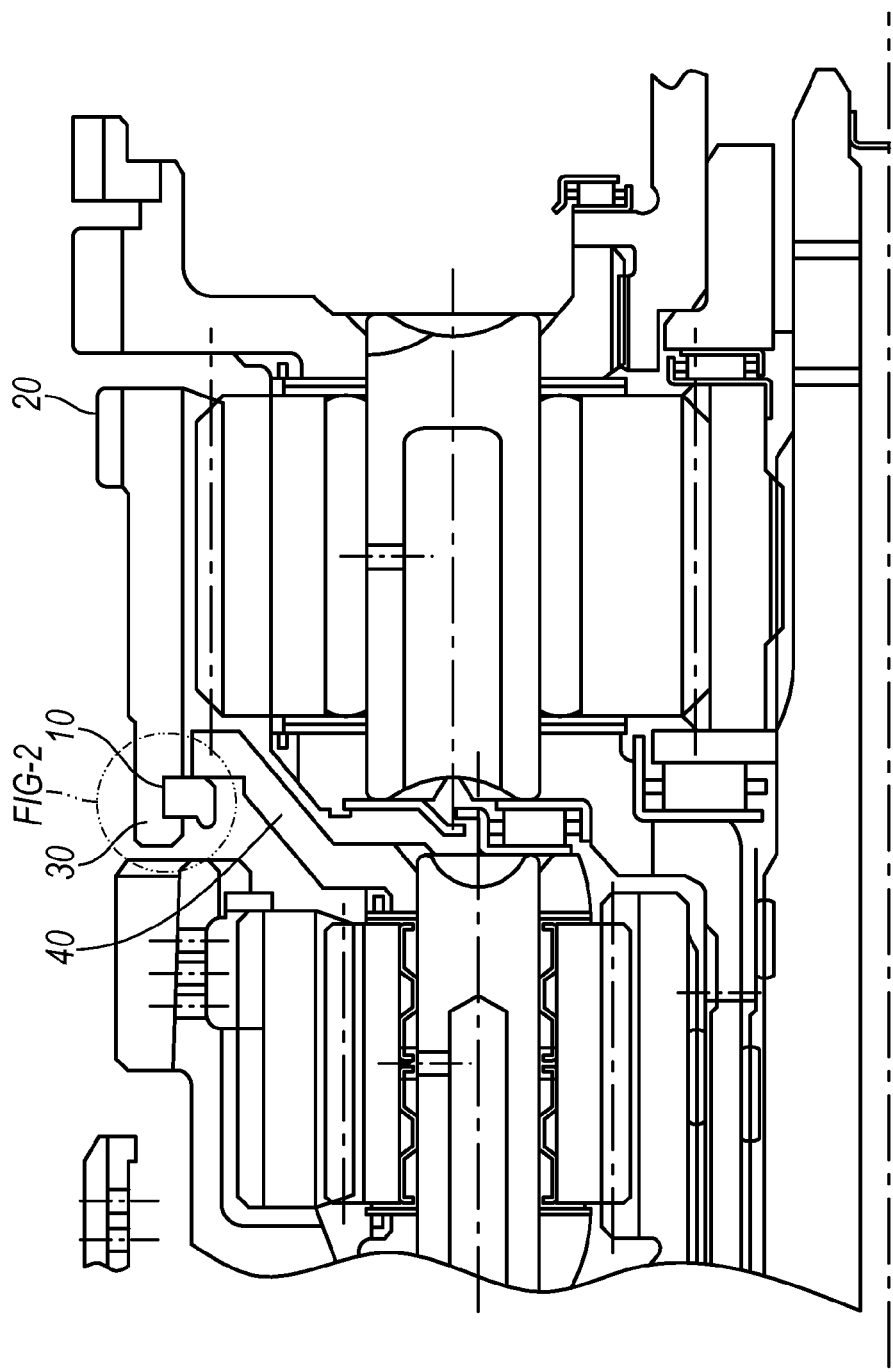
FIG. 3 is a side cross-sectional view of the snap ring assembled in a transmission in accordance with an embodiment of the present disclosure.

One application of this invention is illustrated in FIGS. 2 and 3 which depicts a cross sectional view of a transmission 20 having a balanced snap ring 10. The transmission 20 comprises a gear housing 30 having an undercut 32 cut circumferentially around an inner diameter as is known in the art. The transmission 20 includes a gear 45 that rotates about its axis to assist in transmitting torque from the power source to the drive axle (not shown). A component 40, such as a retaining ring, is provided to limit axial movement of a second component, such as the gear 45. The snap ring 10 acts as a stop to limit axial movement of the first and second components 40, 45 relative to the gear housing 30.

Snap rings 10 may be manufactured using many different methods such as, but not limited to, casting, forging, stamping or rolling stock into a circular shape. In some of these manufacturing processes, it may be possible to form the snap ring 10 without the material that would be required to be removed present in the first place. For example, in die casting, a mold can be manufactured such that no axial protrusion exists in the worked area 18. In these cases, no additional grinding or removal step would be necessary.

The cross section of the snap ring 10 is shown as a generally L-shaped section having a single protrusion as shown in FIG. 2. However, other cross sections such as a T-shape or t-shape are within the scope of this invention. An example of an additional protrusion 16c is shown in FIG. 2 in phantom lines extending in an axial direction opposite the first protrusion. With these different cross sections, material may be removed from one or both side of the body 14.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

What is claimed is:

1. A snap ring having a circular shape, the circular shape having a circumference, the snap ring comprising:
   a body section;
   at least one protrusion extending axially from the body section, the protrusion formed partially around the circumference
   wherein the protrusion is designed and configured such that the actual center of gravity of the snap ring is approximately the same as the desired center of gravity of the snap ring.

2. The snap ring of claim 1 wherein the snap ring has an open section and the snap ring has first open end and a second open end adjacent the open section.

3. The snap ring of claim 2 wherein the protrusion extends from the body starting at the first open end and circumferentially around the snap ring less than half the distance of the circumference.

4. The snap ring of claim 3 wherein a second protrusion extends from the body starting at the second open end and circumferentially around the snap ring less than half the distance of the circumference.

5. The snap ring of claim 1 further comprising a second protrusion extending axially from the body in the opposite direction as the at least one protrusion.

6. The snap ring of claim 1 wherein the at least one protrusion and the body form an L-shaped cross section.

7. The snap ring of claim 1 wherein snap ring has an inner diameter and the protrusion extends axially from the inner diameter.

8. A method of balancing a snap ring comprising:
   providing a snap ring having a body and at least one protrusion extending axially from body;
   determining the actual center of gravity of the snap ring;
   comparing the actual center of gravity to a desired center of gravity;
   calculating the amount and location of the protrusion that must be removed from the snap ring so that the actual center of gravity is the desired center of gravity;
   removing at least part of the protrusion in the axial direction so that the actual center of gravity is the desired center of gravity.

9. The method of claim 8 wherein the step of removing at least part of the protrusion in the axial direction comprises grinding.

10. The method of claim 8 wherein the step of determining the actual center of gravity comprises creating a solid model of the snap ring and using a computer to calculate the center of gravity.

11. The method of claim 8 wherein the step of comparing the actual center of gravity to the desired center of gravity is done using computer aided engineering programs.

12. The method of claim 8 wherein the snap rings comprises a second protrusion extending in the opposite axial direction and the step of removing at least a portion of the protrusion comprises grinding both protrusions.

13. A transmission comprising;
   a housing having an inner diameter, and a circumferential groove in the inner diameter;
   a component in the housing; and
   a snap ring having a circular shape, the circular shape having a circumference, the snap ring having a body section and at least one protrusion extending axially from the body section, the protrusion formed partially around the circumference
   wherein the protrusion is designed and configured such that the actual center of gravity of the snap ring is approximately the same as the desired center of gravity of the snap ring.

14. The transmission of claim 13 wherein the snap ring has an open section and the snap ring has first open end and a second open end adjacent the open section.

15. The transmission of claim 14 wherein the protrusion extends from the body starting at the first open end and circumferentially around the snap ring less than half the distance of the circumference.

16. The transmission of claim 15 wherein a second protrusion extends from the body starting at the second open end and circumferentially around the snap ring less than half the distance of the circumference.

17. The transmission of claim 13 further comprising a second protrusion extending axially from the body in the opposite direction as the at least one protrusion.

18. The transmission of claim 13 wherein snap ring has an inner diameter and the protrusion extends axially from the inner diameter.

* * * * *